(12) United States Patent
Tang

(10) Patent No.: US 12,721,300 B2
(45) **Date of Patent: *Sep. 1, 2026**

(54) PET TOILET AND CONTROL METHOD THEREOF

(71) Applicant: PETPIVOT INC, Portland, OR (US)

(72) Inventor: Tieqiang Tang, Shaoyang City (CN)

(73) Assignee: PETPIVOT INC, Portland, OR (US)

( * ) Notice: Subject to any disclaimer, the term of this patent is extended or adjusted under 35 U.S.C. 154(b) by 184 days.

This patent is subject to a terminal disclaimer.

(21) Appl. No.: 18/506,978

(22) Filed: Nov. 10, 2023

(65) Prior Publication Data

US 2025/0134058 A1 May 1, 2025

Related U.S. Application Data

(63) Continuation-in-part of application No. 18/494,672, filed on Oct. 25, 2023, now abandoned.

(30) Foreign Application Priority Data

Nov. 7, 2023 (CN) ......................... 202323002857.0

(51) Int. Cl.
*A01K 1/01* (2006.01)

(52) U.S. Cl.
CPC .................................. *A01K 1/0114* (2013.01)

(58) Field of Classification Search
CPC .... A01K 1/0114; A01K 1/011; A01K 1/0117; A01K 29/005
See application file for complete search history.

(56) References Cited

U.S. PATENT DOCUMENTS

| | | | | |
|---|---|---|---|---|
| 2006/0081191 | A1* | 4/2006 | Deasy | A01K 1/0114 119/166 |
| 2015/0113878 | A1* | 4/2015 | Sward | E06B 5/006 49/63 |
| 2022/0322632 | A1* | 10/2022 | Baxter | A01K 1/011 |
| 2023/0397568 | A1* | 12/2023 | Smith | A01K 1/0114 |
| 2024/0206422 | A1* | 6/2024 | Wang | A01K 1/0047 |

* cited by examiner

*Primary Examiner* — Michael W Choi

(57) ABSTRACT

The present disclosure provides a pet toilet and a control method thereof. The pet toilet includes a circuit board, a first detection module, a base, and a roller rotatably arranged on the base. The first detection module is electrically connected to the circuit board to feed back an electrical signal to the circuit board when a pet enters the roller, and the circuit board controls the roller to rotate according to the electrical signal fed back by the first detection module. The present disclosure aims to solve the problem of misjudgment easily caused the fact that only the weighing sensor is used to perform waste clearing in the prior art. The probability of misjudgment on the defecation of a pet is effectively reduced. The number of times of rotation of the roller is reduced; and the power consumption is reduced.

10 Claims, 6 Drawing Sheets

PET TOILET AND CONTROL METHOD THEREOF

CROSS-REFERENCE TO RELATED APPLICATIONS

This application is a Continuation-in-Part of the U.S. application Ser. No. 18/494,672 filed on Oct. 25, 2023, and entitled "PET TOILET AND CONTROL METHOD THEREOF", now pending, also claims priority of Chinese patent application CN2023230028570, filed on Nov. 7, 2023, and entitled "A PET TOILET AND A CONTROL METHOD THEREOF", the entire disclosures of which are incorporated herein by reference.

TECHNICAL FIELD

The present disclosure relates to the technical field of pet supplies, and in particular, to a pet toilet and a control method thereof.

BACKGROUND

An intelligent litter box includes a base and a roller arranged on the base. The base is also provided with a collection basin for collecting waste. When the roller rotates relative to the base, litter and waste formed by combining feces and litter are first sifted through a sifter inside the roller. The litter passes through meshes of the sifter and is temporarily stored, and the waste falls onto the collection basin from an opening on the roller as the roller rotates. After completing the action, the roller rolls back to an initial position.

At present, the intelligent litter box is provided with a weighing sensor on the base to determine whether a cat has entered the roller for defecation. That is, when the cat has entered the roller, the weighing sensor detects a change in weight and provides a feedback to a controller. After the cat leaves, the weighing sensor provides a feedback to the controller to determine that the cat has left. After the cat leaves, the roller is controlled to rotate to discharge the waste. However, in this way, when the cat jumps over the roller to play or sleep, an action of cleaning up waste would also be performed after the cat leaves. This easily causes a misjudgment.

SUMMARY

The present disclosure aims to provide a pet toilet and a control method thereof, which is used to solve the problem of misjudgment easily caused the fact that only the weighing sensor is used to perform waste clearing in the prior art.

In order to solve the technical problem, the technical scheme provided by the present disclosure is as follows.

A pet toilet includes a circuit board, a first detection module, a base, and a roller rotatably arranged on the base. The first detection module is electrically connected to the circuit board to feed back an electrical signal to the circuit board when a pet enters the roller, and the circuit board controls the roller to rotate according to the electrical signal fed back by the first detection module.

Preferably, the pet toilet further includes a second detection module electrically connected to the circuit board, wherein the circuit board controls the roller to stop rotating according to a signal fed back by the second detection module.

Preferably, the roller is provided with an entrance/exit, and the second detection module is arranged at or near the entrance/exit.

Preferably, a supporting column is arranged on the base; the first detection module is located on the supporting column; a first opening is formed in an end surface, corresponding to the supporting column, of the roller; and at an initial position, the first detection module is arranged in a manner of corresponding to the first opening.

Preferably, the first detection module is a distance sensor, and the second detection module is a photoelectric sensor; and the first opening is located on a central axis of rotation of the roller.

Preferably, a rear end surface of the roller is provided with a first gear; an upper surface of the base is sunken downwards to form an avoiding slot matched with the roller; one end of the supporting column located in the avoiding slot is opposite to an end surface of the roller; the avoiding slot is provided with a first receiving slot for carrying the roller; the base is provided with a motor electrically connected to the circuit board to drive the roller to rotate; a rotating shaft of the motor is connected with a second gear engaged with the first gear; the second gear is located on the first receiving slot; and the roller rotates through the first gear when the motor drives the second gear to rotate.

Preferably, the base is provided with a Hall sensor electrically connected to the circuit board; the roller is provided with several magnetic suction pieces used in conjunction with the Hall sensor; and the circuit board controls the motor according to an electrical signal fed back by the Hall sensor.

Preferably, a second opening configured to waste or pet litter is formed in the roller; the second opening is located at a top of the roller when the roller is at the initial position; the base is provided with a collection cavity for collecting waste; a third opening communicated to the collection cavity is formed in the base; and the second opening is opposite to the third opening in a rotating process of the roller.

Preferably, the Hall sensor is located on a supporting column; there are two magnetic suction pieces; one magnetic suction piece is opposite to the Hall sensor when the roller is at the initial position; and the other magnetic suction piece is opposite to the Hall sensor when the third opening directly faces the third opening.

In addition, the present disclosure further provides a control method applicable to the pet toilet described above. The control method includes steps of:

receiving a first electrical signal fed back by the first detection module;

receiving a second electrical signal fed back by the first detection module; and performing a waste cleaning action to control the roller to rotate to discharge waste.

Preferably, in the process of performing a waste cleaning action, the control method further includes steps of:

detecting a third electrical signal fed back by the second detection module; and controlling the roller to stop rotating when the third electrical signal fed back by the second detection module has been received.

Preferably, after the step of receiving a first electrical signal fed back by the first detection module, the control method further includes a step of:

starting a timer, and forming first time.

Preferably, after the step of receiving a first electrical signal fed back by the first detection module, the control method further includes a step of:

recording first data, wherein the first data includes a number of times of entry and a quantity of pets that have entered the roller for defecation; the number of times of entry is a serial number of a pet entering the roller within one waste cleaning cycle; the quantity of pets that have entered the roller for defecation is an actual quantity of pets that have entered the roller for defecation plus 1; and the actual quantity of pets that have entered the roller for defecation is a quantity of pets that have accumulatively entered the roller within one waste cleaning cycle and stayed for a second preset time period.

Preferably, after the step of receiving a second electrical signal fed back by the first detection module, the control method further includes steps of:

stopping the timer;

determining whether the first time is greater than a second preset time period; and if yes, recording that the quantity of pets that have entered the roller for defecation is the actual quantity of pets that have entered the roller for defecation.

Preferably, after the step of determining whether the first time is greater than a second preset time period, the control method further includes a step of:

if no, subtracting the quantity of pets that have entered the roller for defection by 1.

Preferably, before the step of performing a waste cleaning action, the control method further includes steps of:

receiving the first electrical signal fed back by the first detection module within the first preset time period; and starting to perform the control method from the step of receiving a first electrical signal fed back by the first detection module.

Preferably, after the step of performing a waste cleaning action, the control method further includes a step of:

clearing the first time and the first data.

Preferably, after the step of receiving a second electrical signal fed back by the first detection module, the control method further includes a step of:

matching the first data.

Preferably, the first detection module is a distance sensor, and the second detection module is a photoelectric sensor;

the first electrical signal is an electrical signal fed back to the circuit board when the first detection module has detected a decrease in a distance; and the second electrical signal is an electrical signal fed back to the circuit board when the first detection module has detected an increase in a distance.

Compared with the prior art, the present disclosure has the beneficial effects below: In the present disclosure, the first detection module is arranged on the pet toilet and feeds back electrical signals to the circuit board when a pet enters the roller. The first detection module feeds back an electrical signal to the circuit board, and the circuit board can determine, according to the signal, whether a pet has entered the roller. After the pet leaves the roller, the first detection module feeds back the electrical signal to the circuit board before the pet has not entered the roller to determine, according to this signal, that the pet has left the roller, so as to control the rotation of the roller and solve the problem of misjudgment easily caused the fact that a weighing sensor is used to perform waste cleaning in the prior art. The probability of misjudgment on the defecation of a pet is effectively reduced; the number of times of rotation of the roller is reduced; and the power consumption is reduced.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

Figure 1:
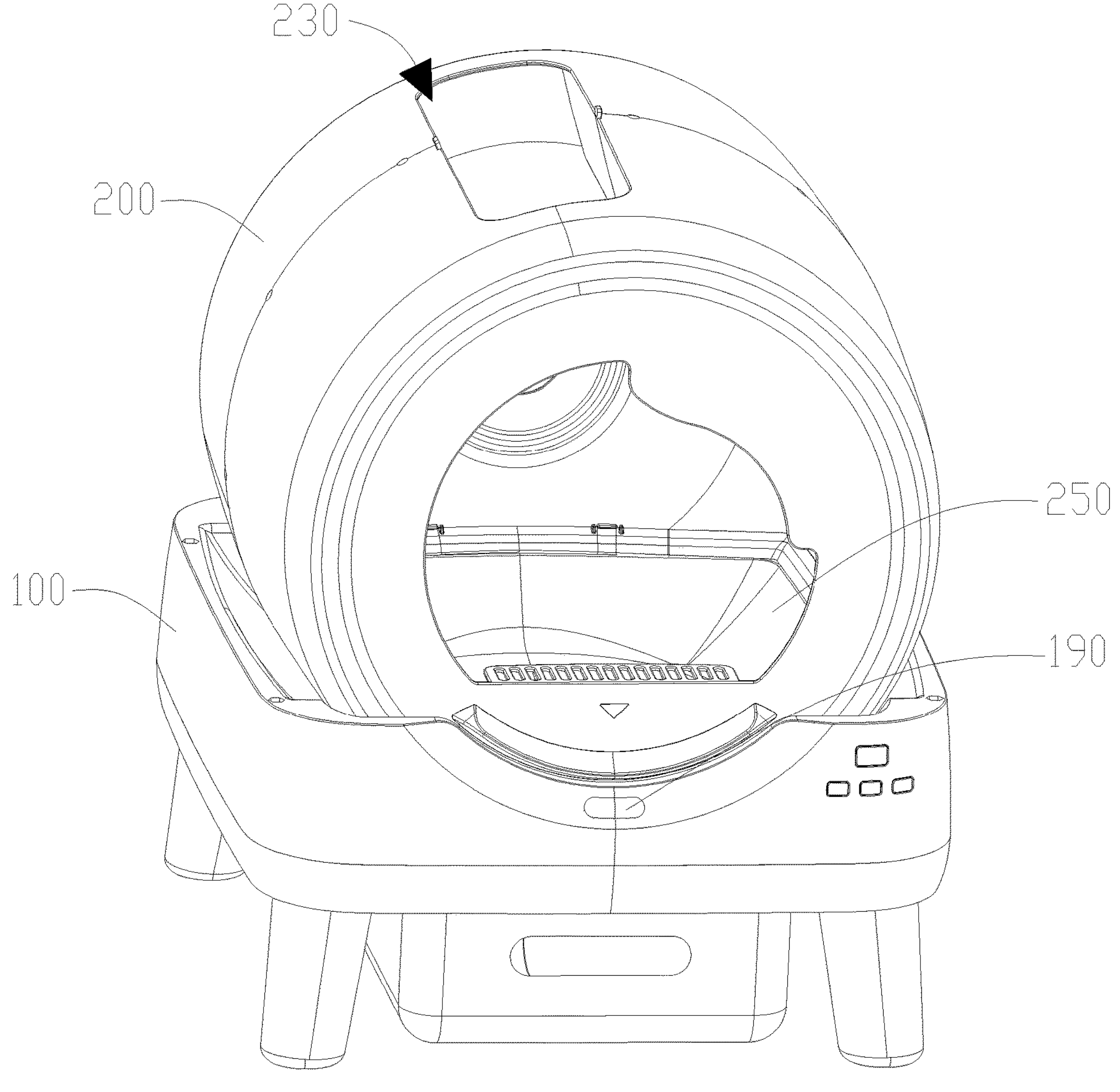
FIG. 1 is a three-dimensional diagram of a pet toilet according to the present disclosure.
Figure 2:
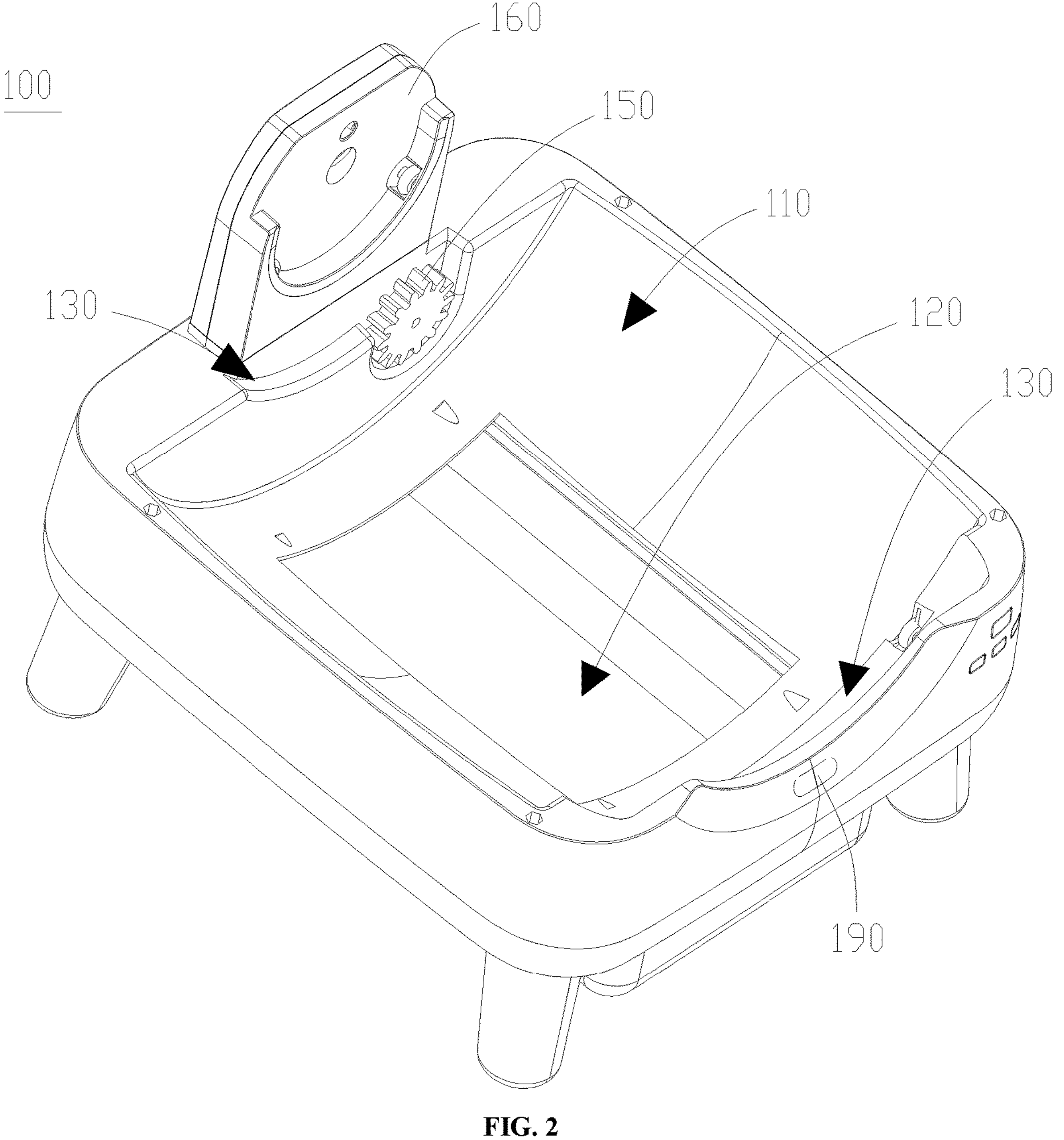
FIG. 2 is a structural diagram of a base on a pet toilet according to the present disclosure.
Figure 3:
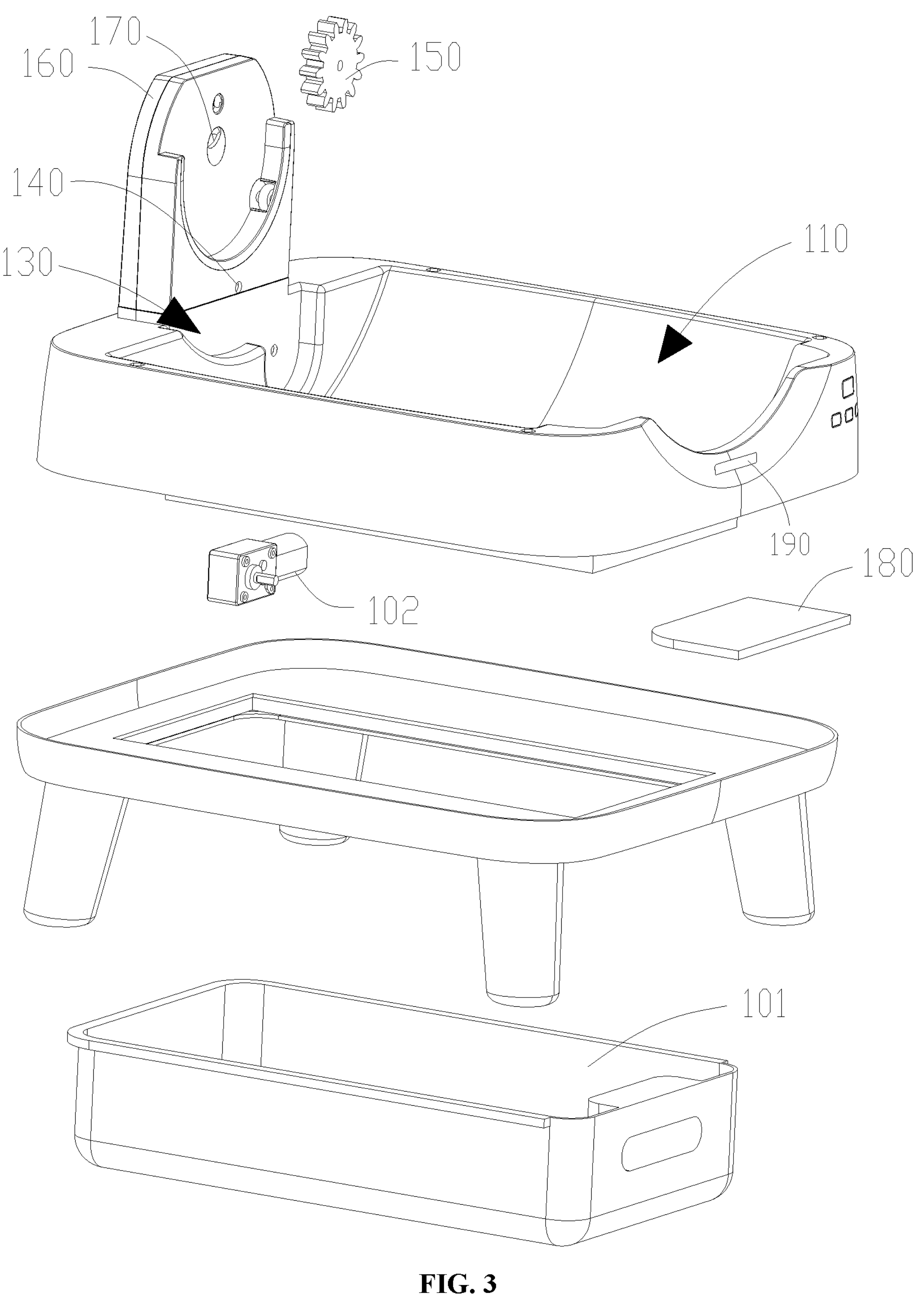
FIG. 3 is an exploded diagram of a base on a pet toilet according to the present disclosure.
Figure 4:
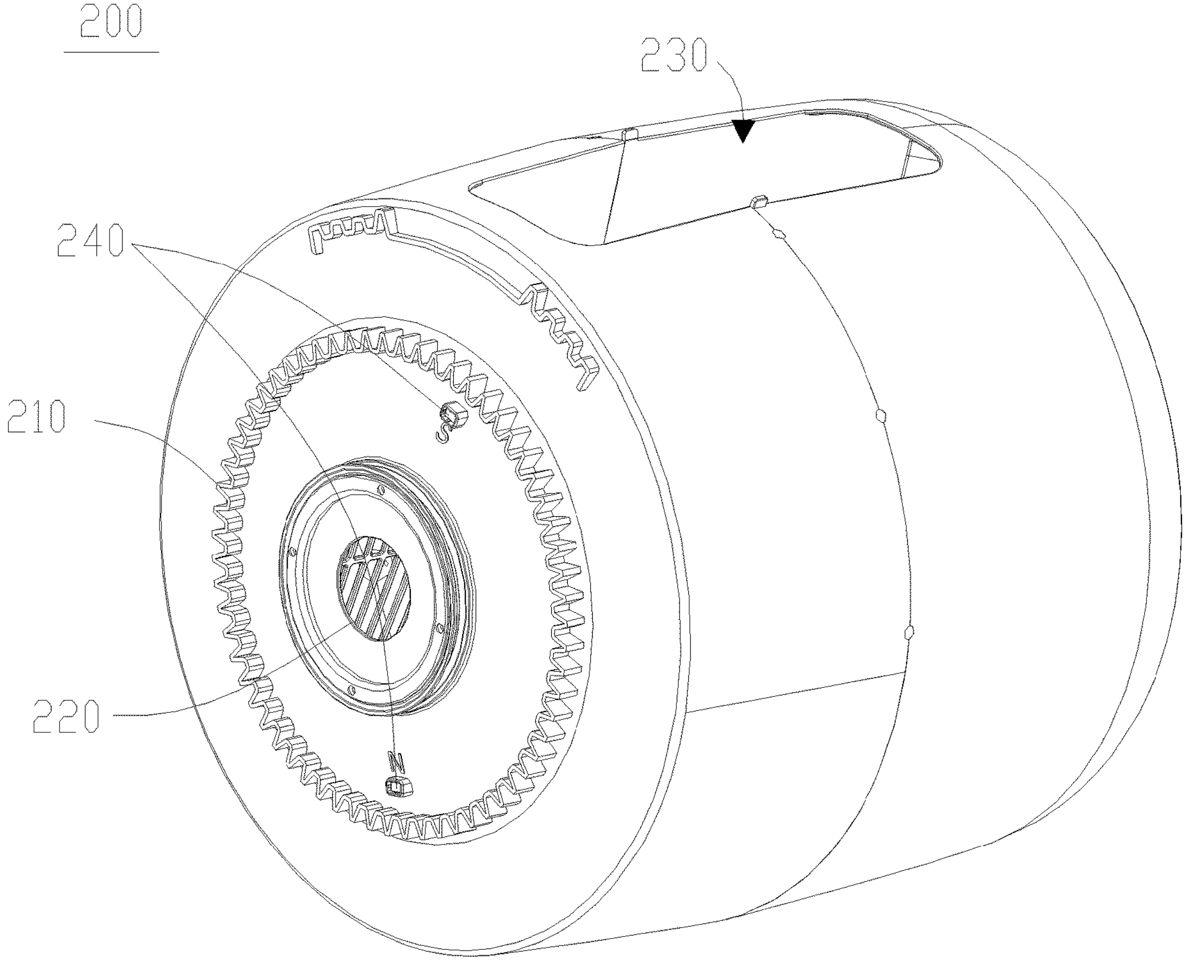
FIG. 4 is a structural diagram of a roller on a pet toilet according to the present disclosure.

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Referring to FIG. 1 to FIG. 4, a pet toilet in the embodiments of the present disclosure is provided.

The pet toilet includes a circuit board 180, a first detection module 170, a base 100, and a roller 200 rotatably arranged on the base 100. The first detection module 170 is electrically connected to the circuit board 180 to measure a distance, and the circuit board 180 controls the roller 200 to rotate according to a signal fed back by the first detection module 170.

In this embodiment, the first detection module 170 is arranged on the pet toilet and feeds back electrical signals to the circuit board 180 when a pet enters the roller 200. The first detection module feeds back an electrical signal to the circuit board, and the circuit board can determine, according to the signal, whether a pet has entered the roller. After the pet leaves the roller, the first detection module feeds back the electrical signal to the circuit board before the pet has not entered the roller to determine, according to this signal, that the pet has left the roller, so as to control the rotation of the roller and solve the problem of misjudgment easily caused the fact that a weighing sensor is used to perform waste cleaning in the prior art. The probability of misjudgment on the defecation of a pet is effectively reduced; the number of times of rotation of the roller is reduced; and the power consumption is reduced.

In an embodiment, the pet toilet further includes a second detection module 190 electrically connected to the circuit board 180; and the circuit board 180 controls the roller 200 to stop rotating according to a signal fed back by the second detection module 190. When a pet, a person, or an object approaches the roller 200, the second detection module 190 can detect and stop the roller 200 from rotating, so as to prevent harm to the pet or person and to achieve a protection effect.

Specifically, in the above embodiment, the roller 200 is provided with an entrance/exit 250, and the second detection module 190 is arranged at or near the entrance/exit 250, so as to play a detection role when the pet, the person, or the object approaches the roller 200. Specifically, the second detection module 190 can be arranged at the entrance/exit 250, and can also be arranged on the base 100 or near the entrance/exit 250 of the roller 200, or even inside the roller 200, or the like.

A supporting column 160 is arranged on the base 100; the first detection module 170 is located on the supporting column 160; a first opening 220 is formed in an end surface, corresponding to the supporting column 160, of the roller 200; and at an initial position, the first detection module 170 is arranged in a manner of corresponding to the first opening 220. When the roller 200 is not in a waste cleaning state, the first detection module 170 is opposite to the first opening 220. That is, after a pet enters the roller 200, the first detection module 170 can detect a change in the distance and feed back an electrical signal to the circuit board 180.

In an embodiment, the first opening 220 is located on a central axis of rotation of the roller 200. Therefore, the distance sensor is always opposite to the first opening 220. Specifically, the first detection module 170 is configured to detect a position of a center of an inner bottom of the roller 200 at the initial position, which means that after a pet enters the roller, the first detection module can detect that the distance changes.

Specifically, the first detection module 170 is a distance sensor, and the second detection module 190 is a photoelectric sensor. That is, when a pet enters the roller 200, the first detection module 170 feeds back an electrical signal indicating that the distance decreases to the circuit board 180. The circuit board 180 can determine, according to the signal, that a pet has entered the roller 200. When the first detection module 170 detects that the distance increases, the circuit board 180 receives an electrical signal fed back by the first detection module 170 again to determine that the pet has left the roller 200, thereby controlling the roller 200 to rotate to achieve waste discharging.

The circuit board 180 can be arranged on the base 100, and the second detection module 190 can be an infrared sensor, an ultrasonic sensor, and the like. Of course, in other embodiments, the first detection module 170 can also be an infrared sensor, an ultrasonic sensor, a radar sensor, and the like, and the circuit board 180 can also be arranged on the roller 200 or the supporting column 160, or even arranged externally to independently form a controller. The position of the circuit board 180 will not be limited here.

In an embodiment, a rear end surface of the roller 200 is provided with a first gear 210. An upper surface of the base 100 is sunken downwards to form an avoiding slot 110 matched with the roller 200; one end of the supporting column 160 located in the avoiding slot 110 is opposite to an end surface of the roller 200; the avoiding slot 110 is provided with a first receiving slot 130 for carrying the roller 200; the base 100 is provided with a motor 102 electrically connected to the circuit board 180 to drive the roller 200 to rotate; a rotating shaft of the motor 102 is connected with a second gear 150 engaged with the first gear 210; and the second gear 150 is located on the first receiving slot 130. In this way, when the motor 102 drives the second gear 150 to rotate, the roller 200 rotates through the first gear 210.

In an embodiment, the base 100 is provided with a Hall sensor 140 electrically connected to the circuit board 180; and the roller 200 is provided with several magnetic suction pieces 240 used in conjunction with the Hall sensor 140. The circuit board 180 controls the motor 102 according to an electrical signal fed back by the Hall sensor 140. When the roller 200 rotates to a certain position, namely, when the magnetic suction pieces 240 move to a certain position, the Hall sensor 140 feeds back a signal to the circuit board 180 when detecting a change in a magnetic field. The circuit board 180 controls the motor 102 to work according to the signal.

Specifically, the magnetic suction pieces 240 can be magnets. A second opening 230 configured to discharge waste or pet litter is formed in the roller 200; the second opening 230 is located at a top of the roller 200 when the roller 200 is at the initial position; the base 100 is provided with a collection cavity 101 configured to collect waste; a third opening 120 communicated to the collection cavity 101 is formed in the base 100; and the second opening 230 is opposite to the third opening 120 in a rotating process of the roller 200. Therefore, the waste on the roller 200 can fall into the collection cavity 101 via the second opening 230 and the third opening 120.

In an embodiment, the Hall sensor 140 is located on the supporting column 160; there are two magnetic suction pieces 240; one magnetic suction piece 240 is opposite to the Hall sensor 140 when the roller 200 is at the initial position; and the other magnetic suction piece 240 is opposite to the Hall sensor 140 when the third opening 120 directly faces the third opening 120. In this way, when the roller 200 rotates and the second opening 230 is opposite the third opening 120, the Hall sensor 140 feeds back a signal to the circuit board 180 when detecting a change in the magnetic field. The circuit board 180 controls the motor 102 to rotate anticlockwise according to the signal. When the roller 200 returns to the initial position, the Hall sensor 140 feeds back a signal to the circuit board 180 when detecting a change in the magnetic field again. The circuit board 180 controls the motor 102 to stop rotating according to the signal, so as to control the roller 200 to rotate.

Figure 5:
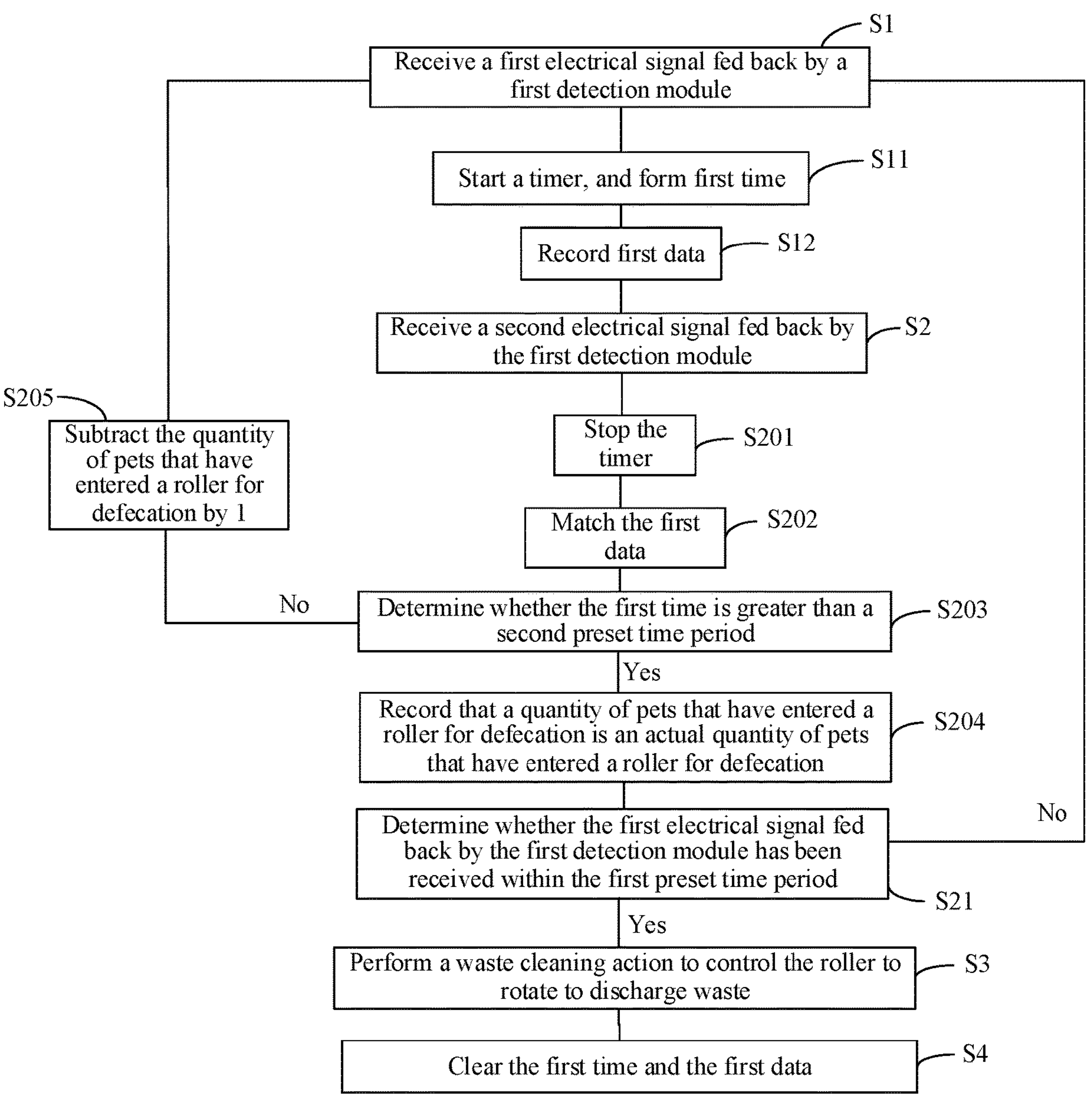
FIG. 5 is a flowchart of a control method for a pet toilet according to the present disclosure.

Referring to FIG. 5, the present disclosure further provides a control method applicable to the pet toilet described above. The control method includes the following steps:

S1, a first electrical signal fed back by the first detection module 170 is received.

When a pet enters the roller 200, the first detection module 170 detects that a signal changes and feeds back a first electrical signal to the circuit board 180, and the circuit board 180 determines, according to the signal, that a pet has entered the roller 200.

S2, a second electrical signal fed back by the first detection module 170 is received.

That is, when the pet leaves the roller 200, the first detection module 170 detects that a signal changes and feeds back a second electrical signal to the circuit board 180, and the circuit board 180 determines, according to the signal, that the pet has left the roller 200.

S3, a waste cleaning action is performed to control the roller 200 to rotate to discharge waste. In this way, after the pet enters the roller 200 and leaves the roller 200, the roller 200 rotates to discharge the waste from the roller 200 to achieve waste cleaning inside the roller. This prevents a misjudgment on performing the waste cleaning operation due to the fact that a pet sleeps on the top of the roller 200 or steps on the top of the roller 200, and reduces the misjudgment of waste cleaning.

Figure 6:
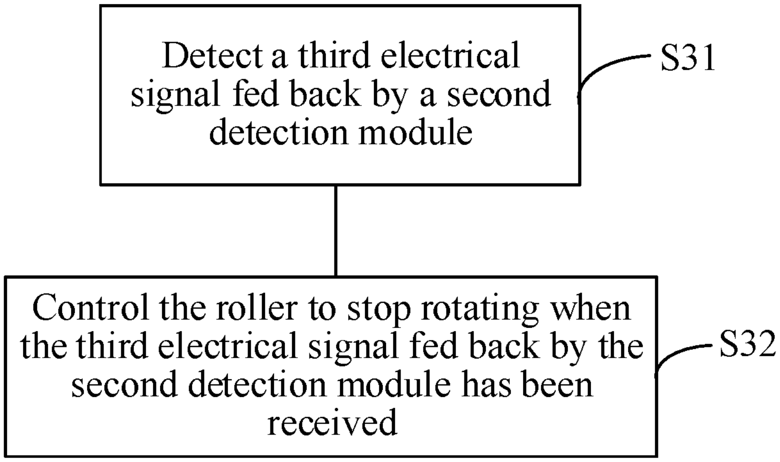
FIG. 6 is a partial flowchart of a control method for a pet toilet according to the present disclosure.

In an embodiment, referring to FIG. 6, in the process of step S3, the control method further includes steps as follows:

S31, a third electrical signal fed back by the second detection module 190 is detected.

S32, the roller 200 is controlled to stop rotating when the third electrical signal fed back by the second detection module 190 has been received.

That is, the circuit board 180 further detects the third electrical signal fed back by the second detection module 190, and controls the roller 200 to stop rotating when the third electrical signal fed back by the second detection module 190 has been detected. When a pet, a person, or an object approaches the roller 200, the roller 200 stops rotating to achieve a protection effect.

In an embodiment, before step S3, the control method further includes a step as follows:

S21, whether the electrical signal fed back by the first detection module 170 is received within the first preset time period is determined.

If no, step S3 is executed.

That is, after the pet enters the roller 200 and leaves the roller 200, if no other pet enters the roller 200 within the first preset time period, step S3 is executed. The first preset time period is reserved to provide time for caking between feces of the pet and pet litter, so as to prevent such a phenomenon that if the roller 200 rotates before the feces of the pet is caked with the pet litter, the roller 200 will be stained by the feces. Specifically, the first preset time period can be 3 minutes, 5 minutes, 10 minutes, 20 minutes, and the like.

If yes, step S1 is repeated.

That is, if the electrical signal fed back by the first detection module 170 is received within the first preset time period, the flow of the control method is started to be executed from step S1. In this flow, if no waste cleaning action is performed within the consecutive first preset time period, after the third preset time period, the waste cleaning action can be directly performed after the pet leaves the roller 200, instead of waiting for the first preset time period. This prevents the impact on use due to excessive waste in the roller 200.

In an embodiment, after step S1, the control method further includes a step as follows:

Step S11, a timer is started, and first time is formed, so as to record a duration, during which, the pet enters the roller 200.

In an embodiment, after step S1, the control method further includes a step as follows:

S12, first data is recorded, wherein the first data includes a number of times of entry and a quantity of pets that have entered the roller for defecation. The number of times of entry is a serial number of a pet entering the roller within one waste cleaning cycle; the quantity of pets that have entered the roller for defecation is an actual quantity of pets that have entered the roller for defecation plus 1; and the actual quantity of pets that have entered the roller for defecation is a quantity of pets that have accumulatively entered the roller within one waste cleaning cycle and stayed for a second preset time period, so that a user can monitor a condition of the pet toilet of this embodiment before waste cleaning.

In an embodiment, after step S2 and before step S41, the control method further includes steps as follows:

S201, the timer is stopped, wherein the formed first time is stay time of the pet in the roller 200.

S202, the first data is matched. That is, the first time is matched with the first data obtained after a pet enters the roller 200 at the last time, so as to determine a serial number of a pet that has entered the roller 200 at the first time within one waste cleaning cycle.

S203, whether the first time is greater than a second preset time period is determined.

S204, if yes, it is recorded that the quantity of pets that have entered the roller for defecation is the actual quantity of pets that have entered the roller for defecation, so as to determine an actual quantity of pets that have entered the roller within one waste cleaning cycle, so that the user can monitors the health of the pets.

It should be understood that when the first time is greater than the second preset time period, it is determined that the pet enters the roller 200 for defecation, rather than jumping into the roller 200 and then directly jumping out of the roller 200 while playing, so as to reduce the misjudgment of performing the waste cleaning action.

In addition, it should be noted that step S201 and step S202 do not have an execution order, and the execution order of step S201 and step S202 is not limited here.

In an embodiment, after S203, the control method further includes a step as follows:

S205, if no, the quantity of pets that have entered the roller for defecation is subtracted by 1, and the flow is started to be executed from step S1. That is, when the first time is less than the second preset time period, it indicates that the pet does not use the toilet in the roller 200, which is an invalid number of times of defecation.

Specifically, in the embodiment described above, the second preset time period can be 5 seconds, 7 seconds, and the like, and manufacturers can customize the second preset time period according to a need.

In an embodiment, after the step of executing a waste cleaning action, the control method further includes a step as follows:

S4, the first time and the first data are cleared. This can release data and prevent data accumulation from affecting the running speed of the entire method.

In the above embodiment, the first detection module 170 is a distance sensor; the second detection module 190 is a photoelectric sensor; the first electrical signal is an electrical signal fed back to the circuit board 180 when the first detection module 170 detects that the distance decreases; and the second electrical signal is an electrical signal fed back to the circuit board when the first detection module 170 detects that the distance increases.

Specifically, when a pet enters the roller 200, the first detection module 170 feeds back an electrical signal indicating that the distance decreases to the circuit board 180. The circuit board 180 can determine, according to the signal, that a pet has entered the roller 200. When the first detection module 170 detects that the distance increases, the circuit board 180 receives an electrical signal fed back by the first detection module 170 again to determine that the pet has left the roller 200, thereby controlling the roller 200 to rotate to achieve waste discharging.

Furthermore, a decrease of the distance detected by the first detection module 170 can be preset. For example, when the circuit board 180 detects that the distance detected by the first detection module 170 has decreased by a value greater than 10 cm, step S2 is executed. In step S3, an increase of the distance can also be preset. For example, when the circuit board 180 detects that the distance detected by the first detection module 170 has increased by 6 cm, step S3 is executed, so as to prevent the phenomenon of misjudgment caused by a fact that the user puts a hand into the roller. Since the waste of the pet and a change in the position of the pet litter may shorten the distance detected by the first detection module 170, if the decrease of the distance in step S1 is greater than the increase of the distance in step S2, the roller 200 can be controlled to rotate after the pet enters the roller for defecation, which prevents the problem that step S3 is not executed due to an inconsistency between the decrease of the distance in step S1 and the increase of the distance in step S2.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A control method applicable to a pet toilet the pet toilet comprising a circuit board, a first detection module, a second detection module electrically connected to the circuit board, a base, and a roller rotatably arranged on the base, wherein the first detection module is electrically connected to the circuit board to feed back an electrical signal to the circuit board when a pet enters the roller, and the circuit board controls the roller to rotate according to the electrical signal fed back by the first detection module, the circuit board controls the roller to stop rotating according to a signal fed back by the second detection module, wherein the control method comprises steps of:

receiving a first electrical signal fed back by the first detection module;

receiving a second electrical signal fed back by the first detection module; and performing a waste cleaning action to control the roller to rotate to discharge waste;

wherein after the step of receiving the first electrical signal fed back by the first detection module, the control method further comprises a step of:

recording first data, wherein the first data comprises a number of times of entry and a quantity of pets that have entered the roller for defecation; the number of times of entry is the number of the pets entering the roller within one waste cleaning cycle; the quantity of pets that have entered the roller for defecation is an actual quantity of pets that have entered the roller for defecation plus 1; and the actual quantity of pets that have entered the roller for defecation is a quantity of pets that have accumulatively entered the roller within one waste cleaning cycle and stayed for a second preset time period.

2. The control method for the pet toilet according to claim 1, wherein in the process of performing the waste cleaning action, the control method further comprises steps of:

detecting a third electrical signal fed back by the second detection module; and controlling the roller to stop rotating when the third electrical signal fed back by the second detection module has been received.

3. The control method for the pet toilet according to claim 1, wherein before the step of performing the waste cleaning action, the control method further comprises a step of:

not receiving first electrical signal fed back by the first detection module within a first preset time period.

4. The control method for the pet toilet according to claim 1, wherein before the step of performing the waste cleaning action, the control method further comprises steps of:

receiving the first electrical signal fed back by the first detection module within a first preset time period; and starting to perform the control method from the step of receiving the first electrical signal fed back by the first detection module within the first preset time period.

5. The control method for the pet toilet according to claim 1, wherein the first detection module is a distance sensor, and the second detection module is a photoelectric sensor;

the first electrical signal is an electrical signal fed back to the circuit board when the first detection module has detected a decrease in a distance; and the second electrical signal is an electrical signal fed back to the circuit board when the first detection module has detected an increase in the distance.

6. The control method for the pet toilet according to claim 1, wherein after the step of receiving the first electrical signal fed back by the first detection module, the control method further comprises a step of:

starting a timer, and forming first time.

7. The control method for the pet toilet according to claim 6, wherein after the step of receiving the second electrical signal fed back by the first detection module, the control method further comprises steps of:

stopping the timer;

determining whether the first time is greater than the second preset time period; and if yes, recording that the quantity of pets that have entered the roller for defecation is the actual quantity of pets that have entered the roller for defecation.

8. The control method for the pet toilet according to claim 7, wherein after the step of receiving the second electrical signal fed back by the first detection module, the control method further comprises a step of:

matching the first data, comprising matching the first time with the first data obtained after a pet enters the roller at the last time to determine the number of the pets that have entered the roller and stayed for the first time within one waste cleaning cycle.

9. The control method for the pet toilet according to claim 7, wherein after the step of determining whether the first time is greater than the second preset time period, the control method further comprises a step of:

if no, subtracting the quantity of pets that have entered the roller for defection by 1.

10. The control method for the pet toilet according to claim 9, wherein after the step of performing the waste cleaning action, the control method further comprises a step of:

clearing the first time and the first data.

* * * * *